United States Patent [19]

Parker et al.

[11] Patent Number: 4,758,261

[45] Date of Patent: Jul. 19, 1988

[54] DIAMMONIUM PHOSPHATE PRODUCED WITH A HIGH-PRESSURE PIPE REACTOR

[75] Inventors: Byron R. Parker, Florence; Barry W. Curtis, Killen, both of Ala.

[73] Assignee: Tennessee Valley Authority, Muscle Shoals, Ala.

[21] Appl. No.: 127,029

[22] Filed: Nov. 30, 1987

[51] Int. Cl.[4] .......................... C05B 7/00; C05B 19/00
[52] U.S. Cl. .......................................... 71/34; 71/43; 71/64.06
[58] Field of Search .......................... 71/34, 43, 64.06; 423/310, 313, 315

[56] References Cited

U.S. PATENT DOCUMENTS 4,619,684 10/1986 Salladay et al. ........................ 71/34

Primary Examiner—Ferris H. Lander
Attorney, Agent, or Firm—Robert A. Petrusek

[57] ABSTRACT

Improved, simple, energy-efficient, and easy-to-operate process for producing granular diammonium phosphate (DAP) fertilizers from anhydrous ammonia, phosphoric acid, sulfuric acid, and water utilizing a rotating drum granulator and a pipe reactor in combination with a specially designed slurry distributor. The pipe reactor operates at pressures of more than 80 pounds per square inch gage and utilizes a special low-impact distributor to uniformly distribute a wide-angle spray of slurry onto the bed of recycled solids in the drum granulator and to provide for a minimum of bed disruption and deformation. This energy-efficient process produces dry, free-flowing granular DAP with little or no fossil-fuel heating requirements for drying and with low recycle ratios which allow for high production rates or increases in production rates when the process is retrofitted into existing plants. Because less equipment is required and because of process efficiencies, both capital and operating costs are decreased either for a new plant or a retrofit to an existing plant as compared to plants producing DAP with the conventional tank preneutralizer process.

16 Claims, 5 Drawing Sheets

4,758,261

DIAMMONIUM PHOSPHATE PRODUCED WITH A HIGH-PRESSURE PIPE REACTOR

The invention herein described may be manufactured and used by or for the Government for governmental purposes without the payment to us of any royalty therefore.

INTRODUCTION

The present invention relates to an improvement in a process for the production of granular fertilizers from ammonia, phosphoric acid, and sulfuric acid; more particularly, it relates to an improvement in the process for the production of granular 18-46-0 grade diammonium phosphate (DAP); and still more particularly, the instant invention relates to an improved method of distribution of slurry produced in a pipe reactor and thereafter distributed at high pressure onto a rolling bed of solids maintained in a horizontally inclined rotating drum granulator. For the purpose of convenience, the term diammonium phosphate as used throughout this disclosure, includes commercial products containing sulfur. In some cases, the sulfur is added as sulfuric acid to the system to adjust the product grade and, in all cases, some sulfur is present in the wet-process phosphoric acids raw material common to the production of all diammonium phosphate. Typical commercial diammonium phosphates are nominally 18 percent nitrogen, 46 percent phosphate as $P_2O_5$, and contain approximately one percent sulfur derived from the feedstock phosphoric acid fed and, in some cases, contain as much as an additional one percent sulfur derived from a separate sulfuric acid feedstream. The sulfur is usually present in the final product as ammonium sulfate.

Improvements in processes for production of granular diammonium phosphate fertilizers are considered relatively important because this material is the most widely produced granular phosphate fertilizer produced in the world today. In the United States, about 10 million tons is produced each year and over twice this amount is produced annually on a worldwide basis. This fertilizer is suited for direct application to crops, for use in dry bulk blends with other fertilizer nutrients, and also for use as an intermediate to produce fluid fertilizers, which fluid material now account for the fastest growing segment of the fertilizer industry. In many cases, a fluid fertilizer can be made more economically from a solid phosphate product such as diammonium phosphate than it can from the basic elements ammonia and phosphoric acid because shipping and handling costs are substantially lower for solids.

BACKGROUND OF THE INVENTION

1. Field of the Invention

The advantages of the present invention were discovered while working to obtain both primary and secondary fill-in data for the process disclosed in U.S. Pat. No. 4,619,684, Salladay et al., Oct. 28, 1986. The investigators who reduced the present invention to practice performed the original small pilot-scale pipe-reactor tests, as disclosed by Salladay et al. supra, at pressures up to 75 pounds per square inch gage (psig). As a follow-up to this work, pilot-plant granulation testing was requested, but the initial tests were not encouraging inasmuch as pipe-reactor pressures above about 45 psig caused significant disruption of the rolling bed of solids in the granulator with resulting high recycle ratios and ammonia evolutions. In view of these observed difficulties, it became obvious that additional improvements would have to be made to this process in order to provide that it could operate consistently to produce a high-quality product. Open aperture slurry distributors including open-end, slotted, and drilled-hole pipe distributors were all tested without success at pressures above about 45 psig, i.e., all of the distributors effected substantial disruption of the materials comprising the rolling bed. In addition, the small pilot-scale testing, referred to supra, was conducted with the pipe reactor operating at only one higher pressure, i.e., 75 psig and one lower pressure, i.e., 12 psig. In our investigations, it was determined that the data from said earlier tests were inconclusive and somewhat erratic and; accordingly, an additional set of tests was completed. The results of this additional set of tests did not correlate well with the initial set. In view of these results, it was decided that small-scale testing with the pipe reactor only should be repeated but with more comprehensive coverage of the pressure range and, more particularly, by extending the pressure range up to 140 psig. Details of this testing are given in greater detail in Example I infra and show that some different conclusions may be drawn which are different from the conclusions resulting from earlier tests because of more comprehensive data points in these latter tests. For instance, in initial small pilot-scale tests, the pipe-reactor pressures were adjusted with a manual diaphragm valve installed on the end of the reaction tube; this method was continued for the later comprehensive tests and the pipe reactor was tested and consistent data obtained for operating pressures up to 140 psig. However, the slurry was discharged from a turned-down, 90-degree elbow fitting installed on the discharge side of the valve and it had already been demonstrated this was not suitable for distributing the slurry into a granulator. A second phase of the testing was therefore begun to test various types of slurry distributors. The valve was removed from the discharge end of the reaction tube and various types of open-aperture distributors tested. These included an open-ended, turned-down elbow; an elbow with bushings inserted to decrease the cross-sectional area for flow; slotted pipe distributors; fan spray nozzles of various spray angles ranging between about 50 to about 90 degrees which effected a flat fan-shaped spray pattern; hollow-cone as well as solid-cone spray nozzles, both producing a circular spray pattern; and flooding nozzles that produced flat 120- to 140-degree, wide-angle spray pattern. Since the initial small pilot-scale testing included only operation of a pipe reactor and not any granulation testing, all slurry distribution systems could be readily tested at pressures up to 140 psig. The small-scale test data showed results that were not readily apparent in previous work that studied only one moderate pressure of about 75 psig. For instance, in these later tests it was discovered that, contrary to Salladay et al.'s interpretation of the theoretical data that ammonia evolutions from the pipe reactor decrease with increasing pressure, the ammonia evolution from the pipe reactor increases rapidly with increasing pressure; but only up to a certain point, i.e., about 75 psig. Quite unexpectedly, the ammonia evolution remained relatively constant from about 75 up to about 140 psig as evidenced by the significantly decreased slope of that portion of the curve comprising FIG. 4 above about 80 psig which will be discussed in greater detail infra. Increasing ammonia evolution with increasing pressure is not surprising since, as shown in Example I infra, for otherwise constant conditions and with a constant phosphoric acid feed and concentration the operating temperature of the pipe reactor increases with increasing operating pressure as might be expected by the ideal gas law and by the increasing temperature of the steam as water evaporates from the ammoniated phosphoric acid slurry. As a result of the increased temperature, the ammonia partial pressure increases at a faster rate than the operating pressure so that free ammonia evolving from the discharge of the pipe increases, but it was somewhat surprising that seemingly at about 75 psig the rates of increased partial pressure and operating pressure were such that the ratio of ammonia partial pressure to operating pressure stopped increasing and reached a relatively stable ratio resulting in an almost constant ammonia evolution. This was not as predicted by Salladay et al. because their theoretical graphical illustration of ammonia versus $NH_3:H_3PO_4$ mole ratio for the ammonia, phosphoric acid, and water system was plotted only at 250° F. As shown in our Example I infra, a constant temperature is not obtained as pressure increases. A constant temperature could be obtained by increasing the water content or similarly by decreasing the phosphoric acid concentration; however, this would be impractical for making a fertilizer product because of loss of process control and substantial increase of required drying heat.

Based on the knowledge gained from the small pilot-scale results, further large pilot-scale granulation tests were performed which tests used higher pipe-reactor pressures and improved flooding spray nozzles as slurry distributor means. It should be pointed out here that, although ammonia evolutions from the pipe reactor are higher at higher pressures, only a portion of the ammonia to the process is fed to the pipe reactor, i.e., about 65 to 70 percent, with the remainder to the bed of solids in the drum granulator. Since there are two sources of ammonia evolution, the pipe reactor and the bed of solids in the granulator, the important point to remember is that the total amount of ammonia evolved is from the granulator from both sources and their interaction is important. Pilot-plant data showed, as discussed in greater detail in Example II infra, that although ammonia evolved from the pipe reactor would be expected to increase with increasing pressure, the total ammonia evolved from the granulator is surprisingly decreased. Salladay et al. surmised this was because the injection of free ammonia as a high-pressure stream of discharged slurry impacts the bed of solids. Although this may be partially true, even with the high-velocity, high-impact slotted distributor presently used in commercial-scale plants, severe disruption of the bed occurs at only 60 psig and even as low as 45 to 50 psig which disruption impedes process control. For otherwise comparable tests, which can be well controlled on pilot scale but which would be difficult and potentially very expensive to set up and control on commercial-scale plants, the low-impact slurry spray distributor resulted in lower overall ammonia evolutions than did the high-impact distributor used by Salladay et al. at pressures of about 75 psig. In addition to less bed disruption, far superior slurry spray coverage was obtained, in the practice of the instant invention. This is an important consideration when subsequently ammoniating the resulting solids to make a homogeneous fertilizer product. Surprisingly, in the practice of the present invention lower temperatures were maintained in the drum granulators than were observed in the practice of the teachings of Salladay et al. Since ammonia vapor pressure over ammonium phosphate solutions is directly related to temperature, in the operation of the present invention lower overall ammonia evolutions were obtained from the granulator. We also discovered that better cooling, most likely evaporative-type cooling, occurs as the high-pressure slurry produced in the pipe reactor is discharged and effects the evaporation of water as the pressure is lowered to atmospheric pressure within the drum granulator. We believe that this cooling is more effective in lowering ammonia evolution from the granulator than any ammonia injection effect.

2. Description of the Prior Art

In U.S. Pat. No. 3,153,574, Achorn et al., Oct. 10, 1964, assigned to the assignee of the present invention, a process for granulation of granular diammonium phosphate fertilizer from wet-process phosphoric acid and ammonia is taught whereby a large preneutralizer tank is required to partially neutralize the acid. This conventional process uses the TVA ammoniator-granulator described in U.S. Pat. No. 2,729,554, Nielsson, Jan. 3, 1956, who teaches a process for ammoniating superphosphate and not for production of diammonium phosphate. See specifically, but not necessarily exclusively, FIG. 3 of U.S. Pat. No. 2,729,554 supra, and the discussion thereof as same relates to the alternately rising and falling motion of the material within the bed. The present invention has the distinct advantage of eliminating the need for the preneutralization step and the large preneutralizer tank of such prior art teachings. The process of the instant invention also eliminates any need for a pressurization step as well as the requirement for special equipment, such as a dehydration chamber, as taught in U.S. Pat. No. 3,415,638, Hemsley et al., Dec. 10, 1968. No complicated acid preparation step, as taught in U.S. Pat. No. 2,902,342, Kerley, Sept. 1, 1959, nor a slurry separation step before granulation, as taught in U.S. Pat. No. 3,310,371, Lutz, Mar. 21, 1967, is required in the practice of the present invention.

In U.S. Pat. No. 3,954,942, Achorn et al., May 4, 1976, assigned to the assignee of the present invention, there is mentioned the production of granular diammonium phosphate in a pipe-cross reactor but no specifics of operation disclosed. In U.S. Pat. No. 4,134,750, Norton et al., Jan. 16, 1979, also assigned to the assignee of the present invention, therein is disclosed pilot-plant operating data for production of granular diammonium phosphate with a pipe-cross reactor. Unike the teachings of U.S. Pat. No. 4,134,750 supra, the practice of the present invention requires no sulfuric acid as feed to the reactor; in this case a simpler pipe reactor, to reduce reactor scale buildup. This elimination of the requirement for sulfuric feed is a significant improvement especially when the quality of the feed phosphoric acid is so poor that maintaining the nonimal 18-46-0 grade of a diammonium product is difficult. When sulfuric acid is fed to a granular diammonium phosphate process, it acts as a diluent which furnishes no major fertilizer nutrient value and decreases the value of the major fertilizer nutrient $P_2O_5$. In both of the Achorn et al. processes and the Norton et al. process supra a reactor is used which operates at relatively low pressures, i.e., 40 psig or less. The present invention uses a reactor operating at much higher pressures which provides the advantage of lower overall ammonia evolutions and recycle ratios.

These advantages will be described in greater detail in several of our Examples infra.

In U.S. Pat. No. 4,427,433, Parker et al., Jan. 24, 1984, assigned to the assignee of the present invention, there is described an energy-efficient process for producing an ammonium polyphosphate granular fertilizer and by which a predictable polyphosphate could be obtained. The process uses a pipe reactor and drum granulator and other equipment similar to that used in the practice of the instant invention. Indeed, it can be shown that the configuration of the pipe reactor is remarkably similar to the reactor of the present invention. However, the polyphosphate product was made at extremely high temperatures, i.e., over 400° F. and had an $NH_3:H_3PO_4$ mole ratio of only about 1.05:1. This process of the prior art was not suitable to produce a higher $NH_3:H_3PO_4$ mole ratio product such as diammonium phosphate, which is ammoniated to a mole ratio of 1.9:1 to 2:1, because of excessive ammonia evolutions at such higher mole ratios, temperatures, and solution concentrations required to produce a polyphosphate-containing product. It has now been determined in the investigations leading to the instant invenion that the reactor used in the Parker et al. process supra can be adapted to produce diammonium phosphate products with judicious adjustment of process parameters and use of our improved distributor. This reactor has advantages over the extremely long-inclined reactors used in the Salladay et al. process discussed supra.

In U.S. Pat. No. 4,601,891, McGill et al., July 22, 1986, assigned to the assignee of the present invention, there is taught a process for producing an ammonium polyphosphate granular fertilizer using a pipe reactor spraying an ammonium polyphosphate melt through fan spray nozzles at about 50 psig onto a falling curtain of solids in a rotating drum granulator. Again this process cannot be effectively utilized to produce a diammonium phosphate fertilizer because, although the reactor might produce and spray the appropriate slurry, the more complicated flighted drum granulator is not conducive to having the required additional ammonia added to the bed of solids because such flights do not allow the necessary submerged sparger to be used. A separate ammoniation step would be necessary thereby resulting in more equipment and higher construction and operating costs. Since diammonium phosphate is produced in a highly-competitive, commodity-type market, it is imperative that simple and minimum-cost equipment and processes be used.

In U.S. Pat. No. 4,619,684, Salladay et al., Oct. 28, 1986, supra, assigned to the assignee of the present invention, there is discussed a process for producing diammonium phosphate which uses similar equipment and operating parameters to that of the instant invention. The present invention might even be considered a continuation of Salladay et al.'s work since the investigators of the present invention performed the initial small pilot-scale testing of the Salladay et al. process as given in their Example I, and the present invention resolves some difficulties of the Salladay et al. process while adding additional substantial improvements thereto. Salladay et al. claim operation of a reactor within the range of 40 to 80 psig although their Example III, which shows results of testing in a commercial plant, discloses only 40 psig and; although their Example I does show reactor operation at 75 psig, this was a test of reactor operation only, i.e., they did not distribute the reactor slurry into a granulating vessel. As a result, conditions in their commercial plant test were such that pressures much above about 40 psig resulted in the bed of solids in the granulator being so blown about and deformed by the high pressure and high-velocity gases and slurry stream from the reactor that consistent operation could not be sustained. Subsequent follow-up testing by the present investigators in a granulation pilot-plant facility verified the difficulties of distributing a high-pressure stream from the reactor without severe deformation of the granulator bed of solids and resulting degregation of resulting product. Accordingly, we performed additional testing to correct this problem and discovered that one type of special distributing nozzle, one which had at times been used to apply fertilizer solutions onto fields in farm applications but which had not been used either to distribute ammonium phosphate slurries as in a plant producing diammonium phosphate or to distribute similar products at rather high pressures, i.e., 80 psig and higher, was most suitable. The test work leading to the discoveries of the instant invention and described further in greater detail in the Examples below showed that a spray nozzle commonly referred to as a flooding nozzle allowed excellent slurry distributions at 80 psig reactor pressures and even at pressures as high as 140 psig. This nozzle provided the advantages of a low-velocity and low-impact slurry spray and a wide angle of dispersion, i.e., about a 130-degree arc to cover a large area with each nozzle while allowing the nozzle to be spaced substantially closer to the bed of solids in the granulator which greatly simplifies any retrofit installation because space is usually a premium not only in existing plants, but also in newly planned installations. Our data also show that the use of this slurry distributor resulted in lower granulator temperatures for otherwise comparable conditions and lower resulting ammonia evolutions from the granulator. These ammonia evolutions are even lower than those reported in Salladay et al.'s process, which indicates that a high-pressure, high-velocity spray that injects the free ammonia into the moist bed of granules is not the best mechanism to result in lower ammonia evolutions and that the extra evaporative cooling resulting from the present invention's special spray distributor is more significant since this spray is a low-impact one which gives an excellent and uniform distribution of slurry especially at high pressures. We, of course, are aware of the slotted aperture distributor used by Salladay et al. and are also aware that it can be useful since we were, during our pilot-scale testing, the first to use a slotted distributor with a pipe or pipe-cross-type reactor to produce granular fertilizers. We are also aware of the limitations of this type of slotted distributor which limitations include a poorer, less uniform spray pattern and higher spray velocity and higher spray impact than the distributor of the present invention, especially when operated at higher pressures contemplated in the instant invention.

Salladay et al. supra also use a long (over 35 feet long plus slurry distributor section) reactor with a specially designed ammonia sparger with a series of drilled holes that must be specially designed and sized to allow uniform pressure dispersion and distribution of the ammonia feed. The reactor of the present invention, as shown in FIG. 2 infra, and described in greater detail infra is of a different design which requires less space for installation. As has been noted supra, this is an extremely important consideration since space is a precious commodity if this process is to be effectively retrofitted to an existing plant. The reactor means of the present invention allows the initial reaction to be carried out in a vertical orientation and at a relatively low velocity in a pool of partially ammoniated acid slurry with a high residence time to thereby improve ammonia retention of the acid and allow good internal separation of the gas-liquid phases. The horizontal section which is just downstream from said vertical section, is sized to yield higher velocities of slurry movement and allow vertical separation of the gas and liquid phases to be maintained while minimizing the retention time with resulting minimization of unit heat losses which, with the intimate mixing of liquids in the vertical section and vertical to horizontal transition section, result in no material buildup problems. In addition, because the reactor of the present invention has an initial vertical section, the ammonia sparger is only a straight open-end pipe which effects very uniform ammoniation of the phosphoric acid and alleviates the need for a specially designed ammonia sparger as required with Salladay et al.'s long, horizontally inclined reactor.

For ease in comparing the advantages and attributes of the instant invention, especially the reactor slurry distributor, but also higher operation pressures over the prior art, particularly that taught by Salladay et al., following is a tabulated summary of pilot-plant operation results from process operating parameters taught by the instant invention versus those of the Salladay et al. process for otherwise comparable operating conditions. These pilot-scale tests were performed to allow testing of the two processes under comparable operating conditions in the same plant so that an accurate comparison of the processes could be made. Note especially the lower ammonia evolution and drying requirements of the present invention as well as the lower recycle ratio which results in higher production rate capability. The lower recycle ratio is partially due to lower temperatures obtained under otherwise comparable conditions but is principally attributed to the low-impact slurry distributor utilized in the instant invention thereby allowing high-pressure operation of the pipe reactor without severe disruption and blowing away of portions of the solid bed of recycle solids in the granulator.

| Item | Instant invention | Salladay et al. '684 |
|---|---|---|
| Pipe reactor | | |
| Operating pressure, lb/in$^2$ g | 73 | 68 |
| Temperature, °F. | 337 | 347 |
| Slurry NH$_3$:H$_3$PO$_4$ mole ratio | 1.39 | 1.43 |
| Granulator | | |
| Temperature, °F. | 176 | 186 |
| Recycle ratio, lb/lb product | 1.8 | 5.0 |
| Ammonia evolution, % | 13 | 16 |
| Dryer heat, Btu · 10$^5$/ton product | 0 | 2.7 |
| Product NH$_3$:H$_3$PO$_4$ mole ratio | 1.94 | 1.91 |

SUMMARY OF THE INVENTION

Several new and advantageous features of the instant process over conventional and prior art processes are realized in the present invention. Among these advantageous features are:

A. The equipment used in the practice of the instant invention is simple, economical, readily obtained, and easy to operate.

B. The instant process effectively utilizes the chemical heat of reaction to evaporate water from the feed acids and the resulting homogeneous granular product to substantially eliminate the need for use of fossil fuel.

C. The slurry distributor used in our process allows the pipe reactor to operate at high pressures by utilizing the advantages of high-pressure spraying to flash evaporate larger quantities of water as the pressure is suddenly decreased from reactor pressure to atmospheric pressure when the slurry leaves the distributor. The distributor, however, by virtue of its characteristics of (1) wide angle, and (2) low impact, eliminates the distinct disadvantage of a high-velocity, high-impact spray which normally severely deforms the bed of solids in the granulator.

D. The improved slurry distribution utilized in the instant process results in an increased percentage of product-size material in the granulator. In our pilot-plant tests, an average of 74 percent of the granulator discharge product was onsize product-size material. This is a significantly higher percentage of product-size material than the 40 to 50 percent usually found even with other improved pipe-reactor processes. This higher percentage of product size allows lower recycle ratios and resulting higher production rates.

E. The improved high-pressure, low-impact slurry spray used in our invention also results in further cooling within the granulator. This further cooling is gained essentially without cost and is significantly more effective and less expensive than increasing airflows through the granulator by replacing exhaust fans with larger fans or by increasing recycle ratios, the usual methods of increasing cooling within a granulator; of course, increasing the recycle ratio would decrease production rates unless substantial monies are expended to renovate the solids handling equipment to handle larger quantities of recycled material.

F. The high-pressure reactor and improved slurry distributor used in our process results in substantial savings in capital investment and operating costs since an existing conventional DAP plant, even one with a pipe-reactor retrofit, can have its production rate increased at least 30 percent by changing over to the instant invention.

OBJECTS OF THE INVENTION

Currently, granular diammonium phosphate is almost exclusively produced by the conventional tank preneutralizer process of Achorn et al. U.S. Pat. No. 3,153,574 supra. This process results in a high solids recycle ratio to the granulator of about 5 pounds recycle per pound of product. In addition, drying requirements are about 400,000 Btu's per ton of product; fossil fuels, such as fuel oil, are typically used to furnish this heat. To build a new commercial plant to produce diammonium phosphate would cost approximately $400,000 for each ton/hour of capacity.

Accordingly, it is the principal object of the instant invention to decrease the installation and production costs for granular diammonium phosphate. Salladay et al. in U.S. Pat. No. 4,619,684 supra, claim that their pressure reactor will allow retrofit to existing plants at a cost of $5,000 per ton/hour capacity. The improved slurry distribution system of the instant invention will not only allow the Salladay et al. process to operate in granulation plants at their higher claimed pressures and not be limited because of severe bed deformation, but will also improve on their process by decreasing the resulting recycle ratio to about 2 pounds per pound of product as shown in our Examples infra. For example, an existing 50-ton-per-hour conventional plant using the Achorn et al. process (U.S. Pat. No. 3,153,574) supra, can be increased to about 70 tons per hour by retrofitting the Salladay et al. process because of a lower recycle ratio of 3 pounds per pound of product, but can be even further increased by the practice of the instant invention to slightly more than 90 tons per hour, an increase of about 30 percent over Salladay et al. and 80 percent over the prior art and at a total retrofit cost of about $10,000 which is only $500 for each ton/hour increase in capacity.

Another object of the present invention, as it relates to the aforementioned improved process modification, is the realization of significantly improved distribution of slurry onto the bed of solids in the granulator with corresponding improvements in granulation efficiency and decreases in oversize formation.

Still another object of the present invention is to allow a pipe reactor to effectively operate at high pressures and still allow good slurry distribution which will result in lower process ammonia evolutions, recycle ratios, and elimination of fossil-fuel drying requirements.

Still a further object of the present invention is the effecting in the one-stage formation, at high pressures, of an ammonium phosphate slurry and the efficient distribution of this high-pressure slurry to provide liquid phase for granulation of particles of fertilizer which simultaneously are ammoniated further in a drum granulator to produce homogeneous diammonium phosphate granules which do not require drying when a phosphoric acid of nominal concentration of 40 percent $P_2O_5$ is fed to said process.

The present invention, together with further objects and advantages thereof, will be better understood from a consideration of the following detailed description set forth below, it being understood that this more detailed description is given by way of illustration and explanation only and not necessarily by way of limitation, since various changes therein may be made by those skilled in the art without departing from the true spirit and scope of the present invention.

GENERAL DESCRIPTION OF THE DRAWINGS

DETAILED DESCRIPTION OF THE DRAWINGS

Figure 1:
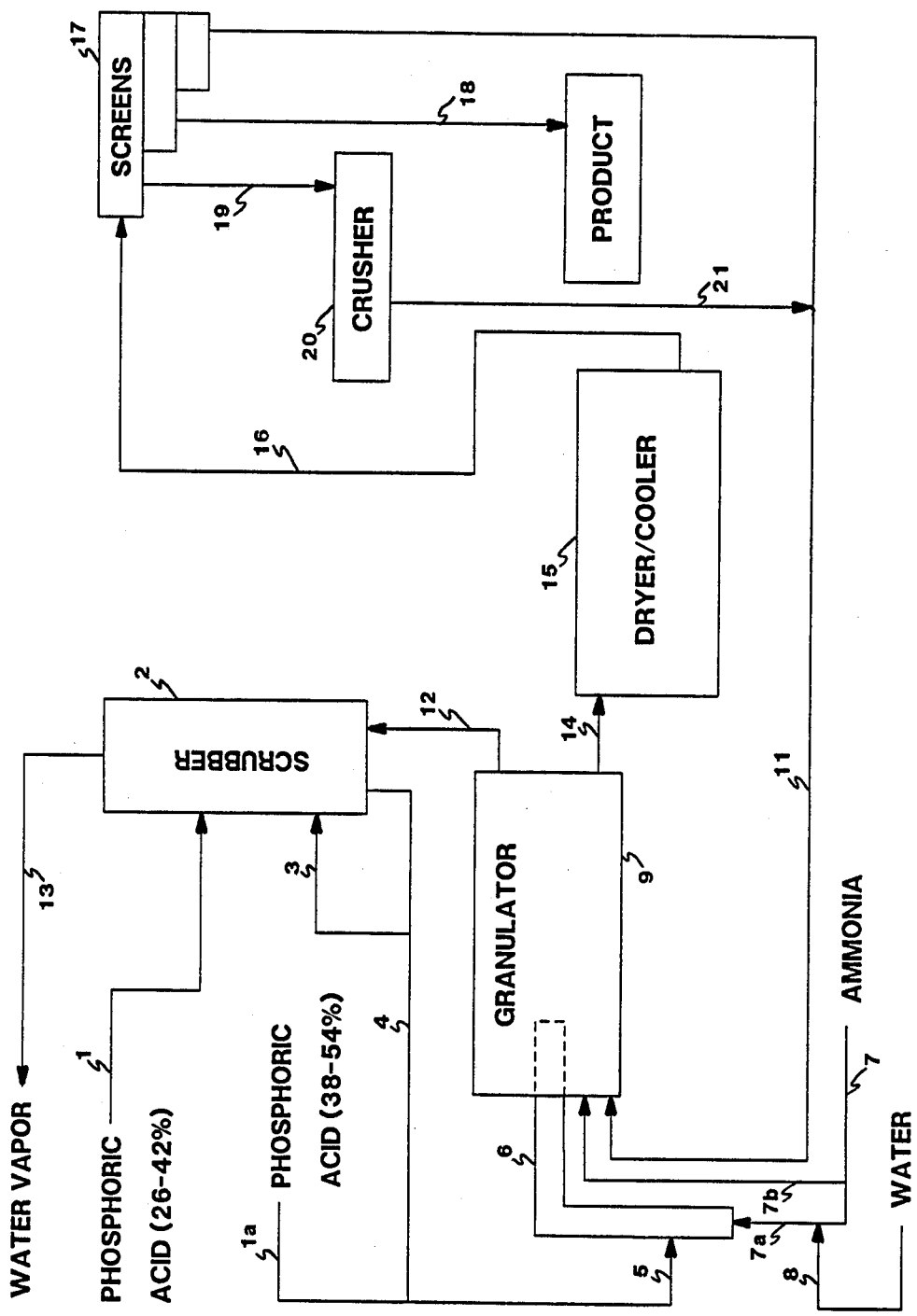
FIG. 1 represents a simplified flowsheet of the process of the present invention for the production of granular diammonium phosphate.

Referring now more specifically to FIG. 1, therein is shown a simplified flowsheet of the process of the present invention for the production of granular diammonium phosphate. The feed phosphoric acid to this process is brought into the process from a source not shown and is usually split into two feed streams to the process as shown by lines 1 and 1a. Phosphoric acid in line 1, usually a weak source varying from about 26 to about 42 percent $P_2O_5$ in concentration, is introduced into granulator exhaust scrubber 2 wherein a portion withdrawn therefrom is recirculated via line 3. All concentrations referred to are understood to be on a weight basis unless otherwise notated. A side stream of recirculating phosphoric acid withdrawn from scrubber 2 via line 4 is mixed with phosphoric acid in line 1a, which usually is a stronger acid with concentrations varying from about 38 to about 54 percent $P_2O_5$, to produce a resulting mixed acid in line 5 that is suitable to feed to pipe reactor 6. The concentration of acid feed stream in line 5 is typically from about 37 to about 43 percent $P_2O_5$, and this acid reacts rapidly with a stream of gaseous or liquid anhydrous ammonia fed from a source not shown via line 7 and line 7a into pipe reactor 6. Water from a source not shown can also be introduced via line 8 into said ammonia in lines 7 and 7a before it enters pipe reactor 6 so as to control the temperature of the resulting product to a predetermined level, if desired, but normally the temperature would be adjusted by varying the concentration of the acid feed in line 5. The slurry reaction product from pipe reactor 6 discharges into granulator 9 which can be a rotary drum, pug mill, or other similar equipment where the slurry can react with additional ammonia fed from a source not shown via lines 7 and 7b and coat particles of recycled finely-divided product fed via line 11 from later mentioned sizing means to granulator 9 and bind them together to form granules of diammonium phosphate. The widely used TVA-type rotary drum granulator 9 is particularly suited to containment of vapors discharged from pipe reactor 6 and these vapors are exhausted from drum 9 via stream 12 to granulator exhaust scrubber 2 wherein the recirculating phosphoric acid stream via line 3 removes the free ammonia from said exhaust stream before said stream is exhausted via line 13 wherein typically fluorine is scrubbed in a tail-gas scrubber (not shown) before the remaining air and water vapor is exhausted to the atmosphere. Granulator discharge stream 14, containing various sizes of solid diammonium phosphate particles, is fed to dryer/cooler 15 wherein the particles are cooled or, if required, further dried to the desired requirements before being introduced via line 16 to size-classifying screens 17. Onsize product is taken off screens 17 in line 18 and typically cooled in a cooler (not shown) before transfer to a storage as product. Oversize material from screens 17 is introduced via line 19 to a chain mill, cage mill, or similar crusher 20 and the resulting crushed material fed via line 21 is combined with undersize material from screens 17 and returned to granulator 9 via line 11.

Figure 2:
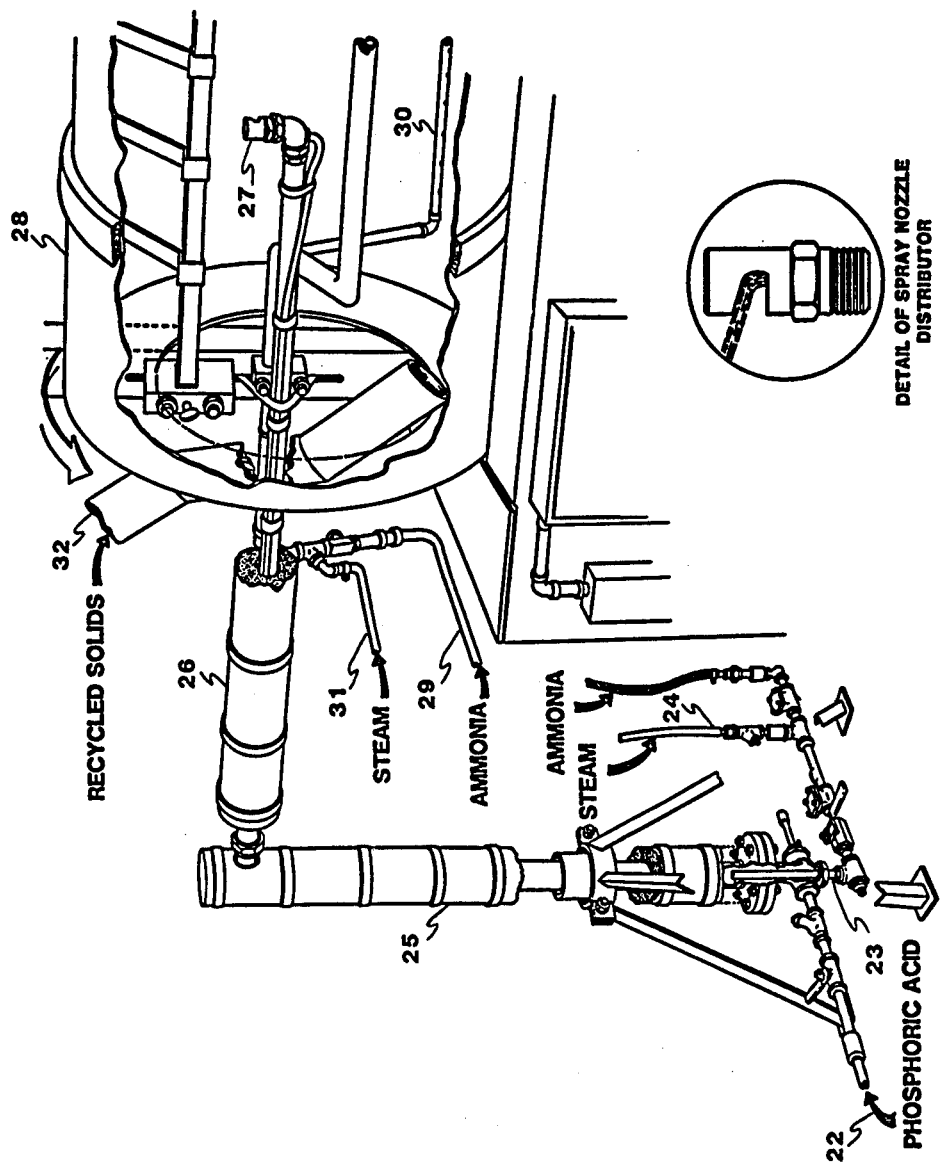
FIG. 2 is a perspective illustration of one configuration of the pipe reactor used in the present invention and its installed relationship relative to the granulator.

As noted above, and referring now more specifically to FIG. 2, therein is shown the configuration of the pipe reactor used in the present invention and its installed relationship relative to the granulator. A stream of phosphoric acid is fed from a source not shown through inlet pipe 22 near the bottom of vertical pipe section 25 of pipe reactor 6 (FIG. 1 supra). Ammonia from a source not shown is added through bottom pipe inlet 23 into a straight open-end pipe extending into vertical section 25 and about 3 inches above phosphoric acid inlet pipe 22. Line 24 is a steam inlet for cleaning both pipe 25 and later mentioned pipe 26 during shutdown periods. The slurry moves upward through vertical section 25 at a relatively low velocity before entering the smaller horizontal section 26 of pipe reactor 6 (FIG. 1) which creates a higher slurry velocity to minimize retention time in said horizontal section 26 and reduce heat losses from the completed reaction. Horizontal section 26 conveys the slurry to flooding nozzle distributor 27. Flooding nozzle 27 is sized to give the desired pipe-reactor operating pressure and sprays the slurry onto a bed of rolling solids (not shown) which is maintained inside rotary drum granulator 28. Additional ammonia is added under said bed of rolling solids through inlet pipe 29 to drilled-hole pipe ammonia sparger 30. As shown in Nielsson U.S. Pat. No. 2,729,554 supra this distribution member, i.e., ammonia sparger 30 is provided with a plurality of apertures therein. Sparger 30 is set fairly close to the inner wall of drum 28 and therefore is positioned well beneath the surface of the bed and at a position where the material within the bed is moving in the direction of rotation of drum 28 and since said apertures face generally against the direction of rotation of drum 28, the ammonia introduced therefrom is in a direction generally countercurrent to the movement of the solid material. Steam is available through inlet 31 to clean the apertures in ammonia sparger 30 when necessary to ensure evenly distributed ammoniation beneath the wide-angle slurry spray resulting from flooding nozzle 27. The resulting granulated DAP product exits drum granulator 28 at the discharge end (not shown) and the resultant solids are subsequently cooled and sized and the undersize materials continuously recycled back to drum granulator 28 through duct 32.

Figure 3:
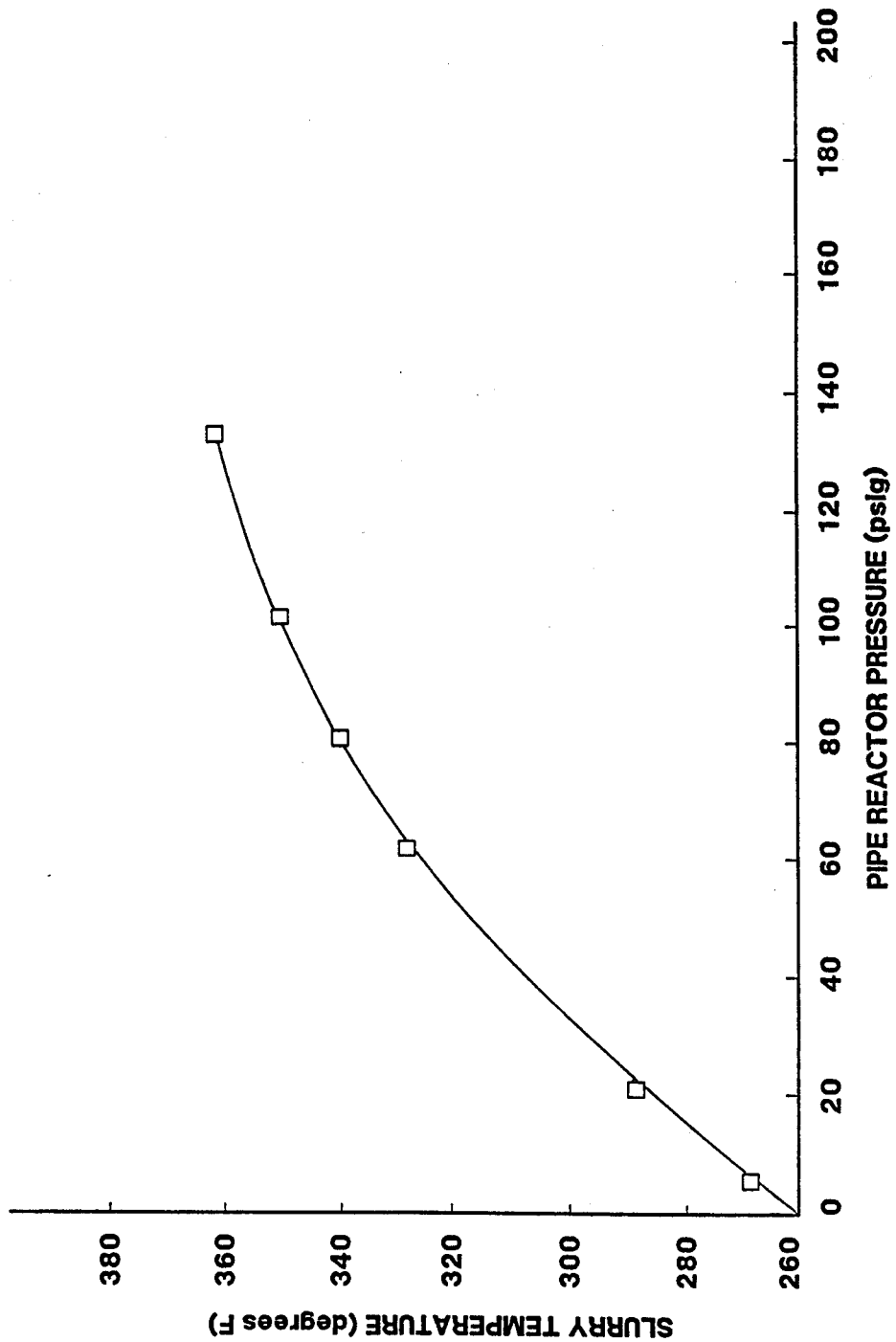
FIG. 3 is a graphical illustration of the effect of pipe-reactor operating pressure on the operating temperature.
Figure 4:
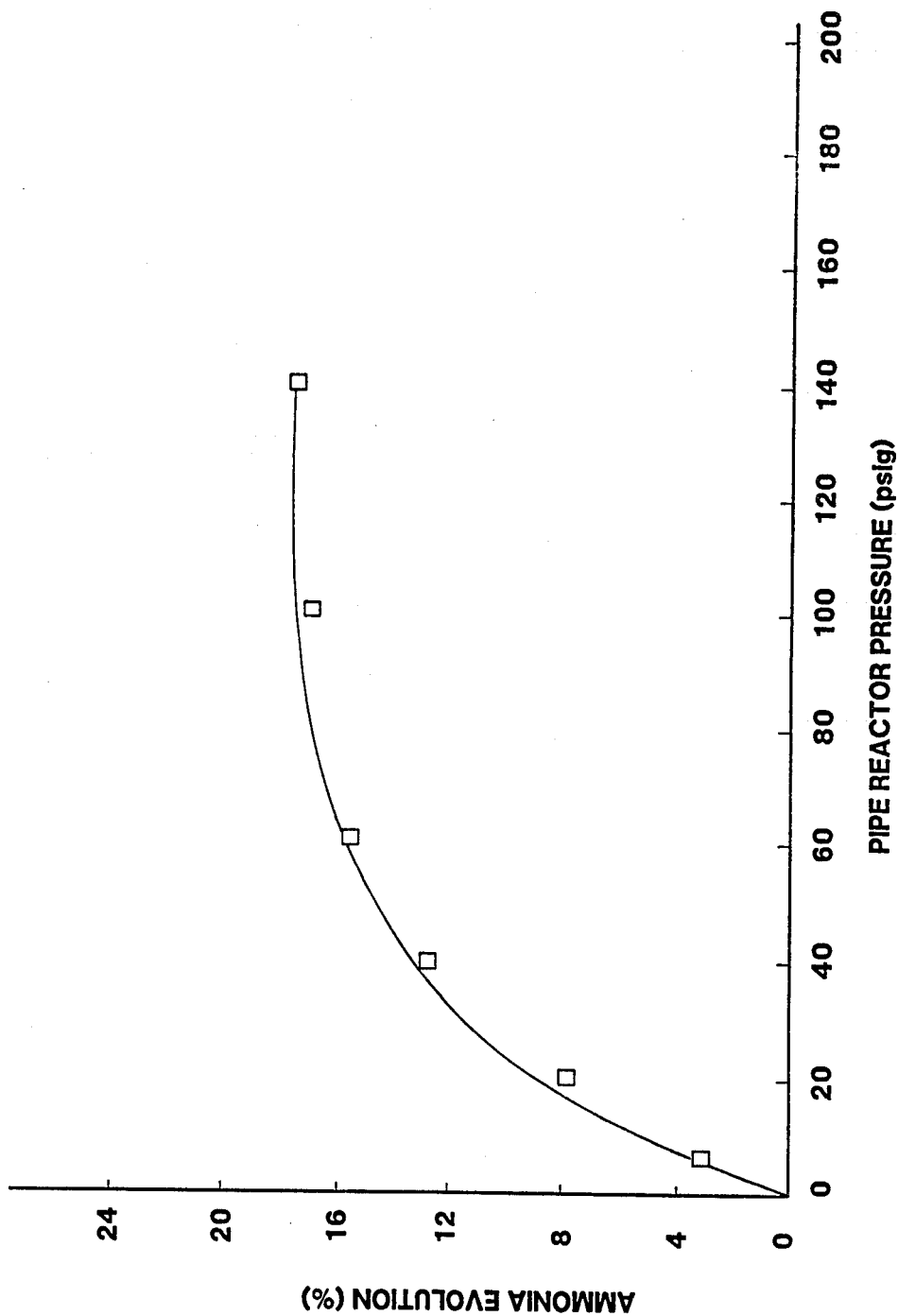
FIG. 4 is a graphical illustration of the effect of the pipe-reactor operating pressure on the total free ammonia evolved from the reactor.
Figure 5:
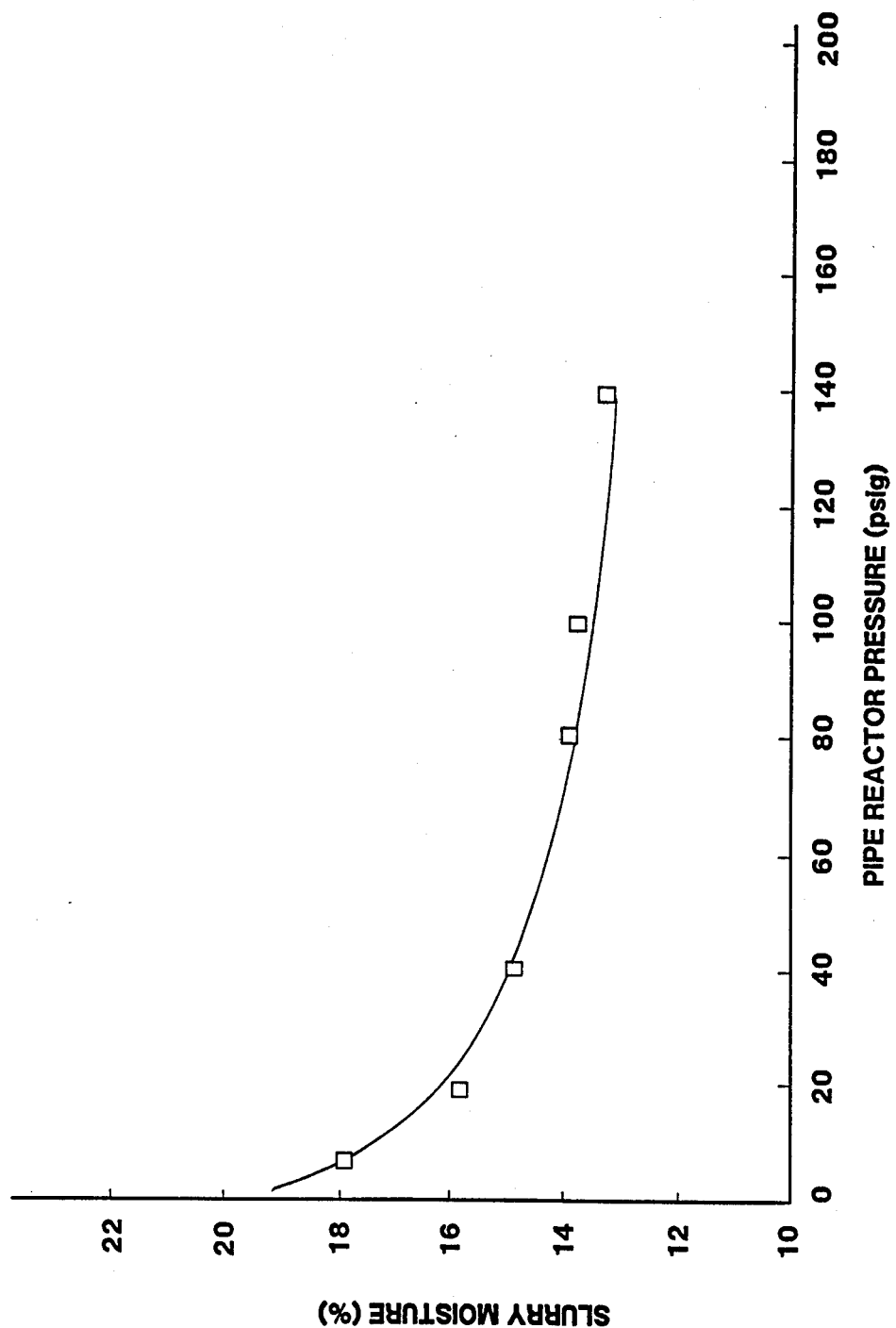
FIG. 5 is a graphical illustration of the effect of the pipe-reactor operating pressure on the moisture content of the slurry discharged from the reactor.

Before introducing FIGS. 3, 4, and 5, it is noted that a special series of tests was performed with a pilot-scale pipe reactor to determine in detail the effect of operating pressure on operating parameters. Prior to this, a detailed comparison of only two operating pressures was available and the data were not conclusive in that conflicting conclusions could be drawn. These comparisons could not be made during actual granulation testing because the reactor discharges into an enclosed granulator and is not readily sampled and two sources, not separable during steady-state operation, for evolved ammonia were present. These present tests conducted in the pursuit of determining the parameters affecting the present invention were valuable in explaining and showing the trend of the effect of pressure on operating parameters and in why previous explanations based on interpretation of theoretical vapor pressure relationships were flawed. The results of the tests are discussed in much greater detail in Example I infra; and FIGS. 3, 4, and 5 are the best statistical fit curves of data relationships obtained from a total of more than 35 of such tests.

For the convenience of the reader and in order to better facilitate a greater understanding of the significance of the graphical depictions contained in FIGS. 3, 4, and 5 a more detailed description thereof is combined in the discussion of Example I infra.

DESCRIPTION OF THE PREFERRED EMBODIMENTS

The instant improved process relates to producing a granular diammonium phosphate with physical and chemical properties ideally suited for direct application, bulk blend, and fluid suspension fertilizer uses. It consists essentially of supplying a weak phosphoric acid stream having a $P_2O_5$ content ranging from about 26 to about 42 percent to a scrubber, either a one- or two-stage system, wherein said acid is recirculated and partially ammoniated by free ammonia evolved from a granulator; simultaneously mixing a side stream of partially ammoniated recirculated acid with a separate feed stream of stronger phosphoric acid having a $P_2O_5$ content ranging from about 40 to about 54 percent to yield a mixed acid stream of said acids in predetermined proportions to produce a blend ranging from about 37 to about 43 percent $P_2O_5$; simultaneously feeding said mixed phosphoric stream acid to a vertical section of a pipe reactor; simultaneously supplying a stream of ammonia to said vertical section of said pipe reactor for contact with said mixed phosphoric acid stream at a temperature ranging from about 310° to 360° F. and, at a pressure ranging from about 80 to 140 psig; subsequently introducing the reaction product resulting from contacting said ammonia and mixed phosphoric acid stream blend of strong and weak acids in said vertical section of said pipe reactor into a generally horizontal vaporization tubular extension of said pipe reactor to ensure continued intimate contact therebetween; subsequently discharging from the downstream end of said generally horizontally disposed vaporization tubular extension of said pipe reactor, at relatively high temperatures, ammonium phosphate slurry and introducing same into the upper end of slightly horizontally inclined rotating drum granulation means; therein maintaining a bed of rolling discrete particles of diammonium phosphate; withdrawing at least a portion of said diammonium phosphate from the lower end of said rotating slightly horizontally inclined drum granulation means; introducing said withdrawn material into cooling means; withdrawing material from said cooling means; introducing said withdrawn resulting cooled material into sizing means; withdrawing oversize particles from said sizing means and introducing said withdrawn oversize particles to size reduction means, such as a chain mill or cage mill crusher; withdrawing resulting crushed initially oversize particles from said size reduction means and returning same, along with undersize particles of predetermined size from said sizing means, into the upper end of said drum and withdrawing from said sizing means onsize granular particles of diammonium phosphate as product; said product being dry, evenly sized, flowable, and free from caking as a result of the fact that the high temperatures and pressure maintained in at least the vertical section of said pipe reactor results in effective heat of chemical reaction usage to allow (1) forming product diammonium phosphate containing 2 percent or less moisture; (2) the substantial elimination of any external heat process requirements subsequent to removing said diammonium phosphate from the lower end of said horizontally inclined rotating drum; (3) process recycle ratios of 2:1 or less; and (4) low ammonia evolutions from said inclined rotating drum because of improved cooling from high-pressure, uniform slurry distribution therein.

The instant invention utilizes higher reactor discharge heat fluxes than pipe or pipe-cross reactors heretofore employed in prior art processes and in addition, utilizes a novel method of slurry distribution that results in significantly improved slurry coverage on and less physical disruption of the bed of solids maintained in the drum granulator. The reactor is comprised of an initial enlarged vertical section with a heat flux of only about $70 \cdot 10^3$ Btu/hour·in$^2$ which gives effective reaction with a substantial reaction time as needed for higher ammoniation rates while allowing the reactor to be of a compact size that would more readily fit into an existing or new plant than the extremely long inclined reactor of the prior art. The subsequent horizontal section of the pipe reactor has a higher heat flux of about $400 \cdot 10^3$ Btu/hour·in$^2$ which allows the essentially completed reacted ammonium phosphate slurry to be quickly transferred to the slurry distributor wherein the specially configured spray nozzle uses a heat flux of $3.9 \cdot 10^6$ to $17 \cdot 10^6$ Btu/hour·in$^2$ to evaporate more water, add additional cooling to the granulator through the increased water evaporation, and effectively and uniformly distribute the slurry to the bed of solids in the granulator with fewer wet spots and oversize balls formed to thereby effect improved granulation efficiencies and a greater percentage of product-size particle granules exiting the rotating inclined drum.

EXAMPLES

In order that those skilled in the art may better understand how the present invention can be practiced and more fully and definitively understood, the following examples are given by way of illustration and not necessarily by way of limitation.

EXAMPLE I

During this series of investigations to better understand the effect of operating pressure on pipe-reactor operating parameters, a series of small-scale pilot-plant tests was conducted. These tests were conducted with a pipe reactor constructed of ½-inch-diameter, Schedule 40 316L stainless steel pipe at a production rate of 100 pounds per hour. In the initial tests, a manually adjustable diaphragm valve was installed on the discharge end of the pipe reactor so that pressures could be maintained by adjustment of the valve. In this way, a series of tests was conducted over a range of pressures and consistent, well-correlated data points were obtained. Results of this series of tests are summarized in FIGS. 3, 4, and 5 infra. In all these tests, a consistent wet-process phosphoric acid of the analysis shown in Table I below was used. Gaseous ammonia at ambient temperature was fed to the reactor to ammoniate the acid.

TABLE I

| Typical Feed Phosphoric Acid Analysis | |
|---|---|
|  | Weight % |
| Total $P_2O_5$ | 40.0 |
| $Al_2O_3$ | 1.2 |
| $Fe_2O_3$ | 0.9 |
| MgO | 0.6 |
| F | 0.9 |
| $SO_3$ | 2.2 |
| CaO | 0.1 |
| Water-insoluble solids | 2.0 |
| Water (K.F.) | 38.0 |

FIG. 3 shows that the temperature increased from 264° to 360° F. as the reactor operating pressure was increased from 5 to 135 psig. This can be theoretically explained since the thermodynamic tables of properties of steam indicate the temperature of the saturated water vapor increases with increasing pressure. It can also be inferred that a higher temperature of the aqueous ammonium phosphate slurry occurs as the pressure increases because of its elevated boiling point at equilibrium conditions. Temperatures obtained in later granulation tests on larger pilot scale compare very favorably with the best statistical fit curve from the small pilot-scale tests.

FIG. 4 shows that, as would be expected, ammonia evolution from the pipe reactor increases with increasing pressure because of the resulting higher temperature and resultant higher ammonia vapor pressure. However, unexpectantly this trend changes at about 75 to 80 psig, and the ammonia evolution is relatively constant from this point up to the 135 psig limits of pressure tested. This indicates the reaction kinetics of the reaction between ammonia and phosphoric acid become significant and that the rate of increase of the reaction with pressure offsets the rate of increase of ammonia vapor pressure with the increasing pressure and temperature so that the overall rate of free ammonia evolution remains essentially constant. This is important because operating at higher pressures is possible with a minimal increase in ammonia evolutions but, at the same time, FIG. 5 indicates that lower moisture slurries can be obtained because more water is evaporated at the higher pressure and temperature of the slurry discharge.

An equally significant result of this series of tests resulted from the further testing of various methods of slurry discharge and distribution at higher pressures. Various slurry distributors were tested including open-end elbow and slotted apertures, and hollow-cone, solid-cone, and fan nozzles; uniformity of distribution was approximately in the order of listing from worst to best. However, it was obvious from visual observation and indications during sampling of slurries that all of the distributors listed yielded gave a high-velocity, high-impact spray that would not be suitable at high pressures to spray distribute reactor slurry onto the pilot-plant granulator bed of solids. Another distributor, a flooding nozzle, which we tested gave excellent indications that it might be a vastly superior and suitable distributor. Even at the higher pressures, i.e., over 100 psig, the spray pattern from this flooding nozzle was uniform over a wide angle and it became obvious to us, while we were obtaining samples of slurry for chemical analysis, that this spray had a low-impact effect. This was an unexpected development since the prior use of these nozzles in the fertilizer industry has been primarily as applicator sprays to distribute fluid fertilizer solutions onto the field where the spray pressure ranges only from about 8 up to 35 psig and typically is in the lower end of this range.

EXAMPLE II

Larger-scale pilot-plant testing at productin rates of about 0.5 tons per hour was also conducted, but these tests were performed in a granulation pilot plant wherein granulation was performed and the complete process tested. Initial tests were made at several pipe-reactor operating pressures but with the heretofore typical round or slotted apertures in the slurry pipe distributor. Operating details of tests at various pressures but otherwise comparable conditions are given in Table II below.

TABLE II

| Pilot-Plant Production of Diammonium Phosphate | | | |
|---|---|---|---|
| Conditions | Run A | Run B | Run C |
| Feed rates, lbs/h | | | |
| Ammonia | | | |
| To pipe reactor | 142 | 142 | 142 |
| To granulator | 69 | 69 | 69 |
| Phosphoric acid (40% $P_2O_5$) | 1,044 | 1,044 | 1,044 |
| Pipe reactor | | | |
| Pressure, lb/in$^2$ g | 8 | 25 | 68 |
| Temperature, °F. | 268 | 304 | 347 |
| $NH_3:H_3PO_4$ mole ratio | 1.48 | 1.43 | 1.43 |

TABLE II-continued

Pilot-Plant Production of Diammonium Phosphate

| Conditions | Run A | Run B | Run C |
|---|---|---|---|
| $NH_3$ loading, lb/h · in$^3$* | 0.62 | 0.62 | 0.62 |
| Heat flux, Btu (10$^3$)/h · $^{2**}$ | | | |
| Vertical section | 68 | 67 | 71 |
| Horizontal section | 378 | 372 | 394 |
| Drum granulator | | | |
| Temperature, °F. | 200 | 189 | 186 |
| Recycle ratio, lb/lb product | 3.3 | 4.2 | 5.0 |
| $NH_3$ evolution, % of feed | 30 | 26 | 16 |
| Dryer/cooler | 4.7 | 4.4 | 2.7 |
| Heat, Btu · 10$^5$/ton product | | | |
| Product | 1.89 | 1.89 | 1.91 |
| $NH_3:H_3PO_4$ mole ratio | | | |

*Based on vertical section only; ammonia loading based on vertical and horizontal sections is 0.50 lb/h · in$^3$.
**Based on values of −2,731 Btu/lb $NH_3$ reacted to form a concentrated monoammonium phosphate solution and −2,083 Btu/lb $NH_3$ to form a concentrated diammonium phosphate solution from a monoammonium phosphate solution.

Referring to Table II supra, the advantages of higher pressure can be readily seen by the decreasing ammonia evolution and the decreasing heat required for the dryer to maintain product moistures at 2 percent or less. In addition, note that a more efficient reaction is indicated by the higher product $NH_3$: $H_3PO_4$ mole ratio of 1.91 at 68 psig (Run C) versus only 1.89 for the lower pressures of 8 and 25 psig in Run A and B, respectively. However, it is noticed that the recycle ratio increases with pressure and this is an indication that the high-impact spray of the round or slotted aperture of the slurry distributor gave poorer distribution and more disruption at higher pressures which resulted in loss of granulation efficiency and required higher recycle rates to maintain control.

EXAMPLE III

The same equipment arrangement was used in this example as was used in Example II supra, except that instead of a slurry distributor with round or slotted apertures, a flooding nozzle was used. The resulting improvements are evident in Table III below.

TABLE III

Pilot-Plant Production of Granular Diammonium Phosphate

| Conditions | Run D | Run E |
|---|---|---|
| Feed rates, lb/h | | |
| Ammonia | | |
| To pipe reactor | 142 | 142 |
| To granulator | 69 | 69 |
| Phosphoric acid (40% $P_2O_5$) | 1,044 | 1,044 |
| Pipe reactor | | |
| Distributor type | Open aperture | Flooding nozzle |
| Pressure, lb/in$^2$ g | 68 | 73 |
| Temperature, °F. | 347 | 337 |
| $NH_3:H_3PO_4$ mole ratio | 1.43 | 1.39 |
| $NH_3$ loading, lb/h · in$^3$* | 0.62 | 0.62 |
| Heat flux, Btu (10$^3$)/h · in$^{2**}$ | | |
| Vertical section | 71 | 70 |
| Horizontal section | 394 | 389 |
| Distributor | —*** | 3,883 |
| Drum granulator | | |
| Temperature, °F. | 186 | 176 |
| Recycle ratio, lb/lb product | 5.0 | 1.8 |
| $NH_3$ evolution, % of feed | 16 | 13 |
| Dryer/cooler | 2.7 | 0 |
| Heat, Btu · 10$^5$/ton product | | |
| Product | 1.91 | 1.94 |
| $NH_3:H_3PO_4$ mole ratio | | |

*Based on vertical section only; ammonia loading based on vertical and horizontal sections is 0.50 lb/h · in$^3$.
**Based on values of −2,731 Btu/lb $NH_3$ reacted to form a concentrated monoammonium phosphate solution and −2,083 Btu/lb $NH_3$ to form a concentrated diammonium phosphate solution from a monoammonium phosphate solution.
***A variable opening diaphragm valve was used to adjust and control the pressure so an accurate cross-sectional area flow could not be accurately measured.

Referring now to Table III supra, it can be appreciated that just by the substitution (Run E) of a flooding, low-impact, wide-angle spray nozzle distributor with otherwise comparable conditions the discharge temperature of the granulator is decreased 10° F. from 186° to 176° F. and the ammonia evolution is decreased from 16 to 13 percent of the total ammonia fed to the process. Drying requirements are decreased so that no drying or use of fossil-fuel heat is required to produce a product with moisture levels of 2 percent or below and more efficient reaction is indicated by the higher product $NH_3:H_3PO_4$ mole ratio of 1.94 versus only 1.91 when the previous style of slurry distribution is used (Run D). But most significantly, a much lower recycle ratio is obtained because of a better, more uniform slurry spray coverage and with the low impact and resulting lower bed disruption, fewer wet spots and resulting lumps were formed. The lower recycle ratio has implications of increasing production rates in existing plant retrofits where the usual limiting factor is the recycle solids handling, screening, or oversize crushing system.

These tests were intended to show a comparison of reactors using an open-aperture distributor as commonly employed in the prior art versus the special low-impact, wide-angle spray distributor of the present invention. Subsequently, granulation tests have been made while operating the reactor at pressures up to more than 105 psig, and these tests have shown that the slurry distributor continues to yield excellent distribution.

Based on the results of the tests described in the Examples supra, the data were used to predict the size nozzle required for the various range of operation pressures. For a granulation pilot-plant production rate of 0.45 tons per hour, the best statistical fit curve of pipe-reactor pressure versus the distributor nozzle cross-sectional area for flow is $$P = 145 - 826A - 446A^2 + 8413A^3 - 7181A^4$$

where A, the cross-sectional are for flow of the flooding nozzle orifice opening in square inches is used to calculate the pressure P in psig. This equation is readily usable for single or multiple nozzle distributors. For multiple nozzle distributors, the total slurry flow is divided into equivalent flow rates for each nozzle and the calculation is performed as with a single nozzle.

INVENTION PARAMETERS

Pilot-plant test work both with the pipe-reactor operation only and with a full production of a granular diammonium phosphate product has led to a collection of operating process criteria and after sifting and winnowing through data supra, as well as other results of tests and operation of the present new, novel, and improved method of producing and distributing an ammonium phosphate slurry to produce a granular diammonium phosphate product, we now present the acceptable and preferred parameters and variables as shown in Table IV below.

TABLE IV
Criteria for Producing Diammonium Phosphate with High-Pressure Distribution of Pipe-Reactor Slurry

| | Limits | Preferred (About) |
|---|---|---|
| Feed acid concentration, % $P_2O_5$ | | |
| To scrubber | 26–42 | 27 |
| To reactor | 37–43 | 40 |
| Ammonia feed to process, % of total | | |
| To reactor | 60–80 | 70 |
| To granulator | 20–40 | 30 |
| Pipe reactor | | |
| Pressure, lb/in² g | 80–140 | 90 |
| Temperature, °F. | 310–360 | 340 |
| $NH_3:H_3PO_4$ mole ratio | 1.2–1.6 | 1.45 |
| Ammonia loading, lb/h · in³ | 0.3–1.0 | 0.6 |
| Heat flux, $10^6$ Btu/h · in² | | |
| Vertical section | 0.04–0.16 | 0.07 |
| Horizontal section | 0.2–1.0 | 0.4 |
| Distributor discharge | 3.9–17.0 | 5 |
| Granulator | | |
| Temperature, °F. | 170–220 | 190 |
| Recycle ratio, lb/lb product | 0.5–4 | 2 |

The pipe-reactor operating pressure and the resulting heat fluxes are a direct result of the sizing of the orifice opening in the flooding spray nozzle. For a given pressure P and a production rate of one ton per hour, the total required nozzle cross-sectional area for flow A can be calculated by rearranging the statistical best statistical fit curve equation in Example III infra and solving for A to give the following equation $$A = 0.62 - 0.00855P + 0.000036P^2$$

where P is the pipe-reactor operating pressure in psig and A is the total cross-sectional area for flow in square inches required for each ton per hour of instantaneous production.

Referring to Table IV, supra, it may be seen as indicated by the low ammonia loadings that higher retention times are required for the pipe reactor than shown in the prior art work of Achorn et al. u.S. Pat. No. 3,153,574 and Norton et al. U.S. Pat. No. 4,134,750 supra and; in addition, although similar retention times are used in this instant invention as in the prior art work of Salladay et al., the pipe reactor of the present invention has a significantly more compact design configuration than the long, inclined reactor of Salladay et al. supra. This is accomplished with an initial short-length, large-diameter vertical section with the high retention time to obtain the high $NH_3:H_3PO_4$ mole ratio slurry required to produce diammonium phosphate and results in a low heat flux of about 0.04·10⁶ to about 0.16·10⁶ Btu/h·in² cross-sectional area while maintaining an ammonia loading of about 0.3 lb/h·in³ to about 1.0 lb/h·³. This vertical section is followed by a short horizontal transfer section with a higher heat flux and short retention time upstream of the slurry distributor. The heat flux for the horizontal section should be about 0.2·10⁶ to about 1.0·10⁶ Btu/h·in² and that for the distributor should be about 3.9·10⁶ to about 17·10⁶ Btu/h·in². The reactor is operated at higher pressures and temperatures than reactors of the prior art. The normal temperature range is 310° to 360° F. with about 340° F. being the preferred temperature. The pressure range is about 80 to about 140 psig being the preferred pressure. Even at these high pressures and correspondingly high heat fluxes, the flooding nozzle design slurry distributor allows uniform, low-impact distribution of the pipe-reactor slurry that with the extra evaporative cooling obtained with the distributor at the higher pressures results in a low preferred recycle ratio of only 2:1.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. An improved process for preparing granular diammonium phosphate eminently suitable for direct application, bulk blend, and suspension fertilizer uses which improved process comprises the steps of:

(a) introducing into scrubber means a weak phosphoric acid and a stream of aqueous ammonia, said phosphoric acid having a $P_2O_5$ content ranging from about 26 to about 42 percent by weight and said stream of aqueous ammonia containing from about 10 to about 30 percent of the total ammonia fed to said improved process and withdrawn as exhaust from later mentioned granulation means;

(b) withdrawing from said scrubber means a side stream of resulting partially ammoniated acid and simultaneously mixing same with a steam of relatively strong phosphoric acid, said relatively strong phosphoric acid having a $P_2O_5$ content ranging from about 40 to about 54 percent by weight, said mixing of said streams of resulting partially ammoniated acid and said relatively strong acid being in a range of ratios to effect a resultant blend thereof having a $P_2O_5$ content ranging from about 37 to about 43 percent by weight;

(c) withdrawing at least a portion of said blend from step (b) supra and introducing same into the tee reaction section of an inline pipe reactor and simultaneously therein contacting said blend with a first stream of ammonia;

(d) moving said ammonia-contacted blend in said tee reaction section in a generally upward vertical direction;

(e) removing the resulting mixture of said blend and said ammonia from said tee reaction section and introducing same into the tubular extension section of said pipe reactor and maintaining the temperature therein in the range of from about 310° to about 360° F. and the pressure therein in the range of from about 80 to about 140 psig to thereby effect the formation therein of resulting aqueous ammonium phosphate slurry reaction product;

(f) moving said resulting mixture of said blend and said ammonia in said tubular extension section of said pipe reactor in a generally horizontal direction;

(g) discharging said resulting aqueous ammonium phosphate slurry formed within said tubular extension of said pipe reactor through spray distributor means, said spray distributor means being a spray nozzle of the flooding type and effecting a relatively low-impact, wide-angle, flat spray pattern of said phospate slurry, into the upper end of an inclined rotating drum and onto the top of a bed of alternately rising and falling discrete particles of diammonium phosphate maintained therein;

(h) introducing through pipe sparger means having a plurality of apertures therein a second stream of ammonia underneath said bed of rolling particles maintained in said drum, said sparger being substantially longitudinal and parallel to the axis about which said drum rotates, and said apertures facing substantially opposite the direction of flow of particles in said bed to thereby provide for introduction of said ammonia in a direction countercurrent to the movement of said particles drum;

(i) withdrawing at least a portion of the resulting diammonium phosphate formed in said rotating inclined drum from the lower end thereof;

(j) introducing said material withdrawn in step (i) supra into cooling means;

(k) removing said material from said cooling means and introducing same into sizing means;

(l) withdrawing oversize material from said sizing means and introducing said oversize material into size reduction means;

(m) introducing a stream of resulting crushed material withdrawn from said size reduction means together with a stream of undersize material withdrawn from said sizing means in step (k) supra into the upper end of said rotating drum in step (g) supra; and (n) withdrawing granular diammonium product from said sizing means in step (k) supra;

said process characterized by the fact that the product resulting therefrom is dry, evenly sized, flowable, and free from caking and results from the high pressures and temperatures utilized therein for effecting effective heat of chemical reaction usage to thereby allow (1) said product diammonium phosphate containing less than about 2 percent moisture; (2) substantial elimination of external process heat requirements subsequent to withdrawing said diammonium phosphate from said drum; (3) process recycle ratios of less than about 2:1; and (4) low ammonia evolutions from said drum resulting from the substantially improved cooling resulting from the high-pressure, uniformly distributed slurry effected by said slurry distributor means in step (g) thereof.

2. The process of claim 1 wherein the discharge area of said slurry distributor means has a heat flux of about $3.9 \cdot 10^6$ to about $17 \cdot 10^6$ Btu/h·in² and the discharge area of flow is defined by the equation $$A = 0.62 - 0.00855 P + 0.000036 P^2$$

where A is the discharge cross-sectional area for flow in square inches for each ton per hour of instantaneous production of diammonium phosphate product and P is the pipe-reactor pressure in psig.

3. The process of claim 1 in which a pug mill is used as said granulator means.

4. The process of claim 2 wherein the discharge area of said slurry distributor means has a heat flux of about $5 \cdot 10^6$ Btu/h·in².

5. The process of claim 4 wherein the temperature maintained in said pipe reactor is about 340° F.

6. The process of claim 4 wherein the pressure maintained in said pipe reactor is about 90 psig.

7. The process of claim 4 wherein the discharge area of said slurry distributor means has a heat flux of about $5 \cdot 10^6$ Btu/h·in²; wherein the temperature maintained in said pipe reactor is about 340° F; and wherein the pressure maintained in said pipe reactor is about 90 psig.

8. The process of claim 2 wherein the heat flux in the vertical section of said pipe reactor is maintained in the range of from about $0.04 \cdot 10^6$ Btu/h·in² to about $0.16 \cdot 10^6$ Btu/h·in².

9. The process of claim 2 wherein the heat flux in the horizontal section of said pipe reactor is maintained in the range of from abut $0.2 \cdot 10^6$ Btu/h·in² to about $1 \cdot 10^6$ Btu/h·in².

10. The process of claim 2 wherein the heat flux in the vertical section of said pipe reactor is maintained in the range of from about $0.04 \cdot 10^6$ Btu/h·in² to about $0.16 \cdot 10^6$ Btu/h·in²; and wherein the heat flux in the horizontal section of said pipe reactor is maintained in the range of from abut $0.2 \cdot 10^6$ Btu/h·in² to about $1 \cdot 10^6$ Btu/h·in².

11. The process of claim 4 wherein the heat flux in the vertical section of said pipe reactor is maintained in the range of from about $0.04 \cdot 10^6$ Btu/h·in² to about $0.16 \cdot 10^6$ Btu/h·in²; and wherein the heat flux in the horizontal section of said pipe reactor is maintained in the range of from about $0.2 \cdot 10^6$ Btu/h·in² to about $1 \cdot 10^6$ Btu/h·in².

12. The process of claim 11 wherein the temperature maintained in said pipe reactor is about 340° F; and wherein the pressure maintained in said pipe reactor is about 90 psig.

13. The process of claim 8 wherein the ammonia loading in the vertical section of said pipe reactor is maintained in the range from about 0.3 lb/h·in³ to about 1.0 lb/h·in³.

14. The process of claim 10 wherein the ammonia loading in the vertical section of said pipe reactor is maintained in the range from about 0.3 lb/h·in³ to about 1.0 lb/h·in³.

15. The process of claim 11 wherein the ammonia loading in the vertical section of said pipe reactor is maintained in the range from about 0.3 lb/h·in³ to about 1.0 lb/h·in³.

16. The process of claim 12 wherein the ammonia loading in the vertical section of said pipe reactor is maintained in the range from about 0.3 lb/h·in³ to about 1.0 lb/h·in³.

* * * * *